(12) United States Patent
Nowozin et al.

(10) Patent No.: US 8,687,893 B2
(45) Date of Patent: Apr. 1, 2014

(54) CLASSIFICATION ALGORITHM OPTIMIZATION

(75) Inventors: Sebastian Nowozin, Cambridge (GB); Pushmeet Kohli, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 427 days.

(21) Appl. No.: 13/077,593

(22) Filed: Mar. 31, 2011

(65) Prior Publication Data

US 2012/0251008 A1    Oct. 4, 2012

(51) Int. Cl.
*G06K 9/62* (2006.01)
(52) U.S. Cl.
USPC .......................................................... 382/195
(58) Field of Classification Search
None
See application file for complete search history.

(56) References Cited

U.S. PATENT DOCUMENTS

2009/0018981 A1* 1/2009 Zhang et al. .................... 706/12
2009/0175533 A1* 7/2009 Sabe et al. ..................... 382/159

OTHER PUBLICATIONS

Avi Arampatzis, Jaap Kamps, and Stephen Robertson. 2009. Where to stop reading a ranked list?: threshold optimization using truncated score distributions. In Proceedings of the 32nd international ACM SIGIR conference on Research and development in information retrieval (SIGIR '09). ACM, New York, NY, USA.*

* cited by examiner

*Primary Examiner* — Atiba O Fitzpatrick
*Assistant Examiner* — Thomas A James
(74) *Attorney, Agent, or Firm* — Pablo Tapia; Jim Ross; Micky Minhas

(57) ABSTRACT

Classification algorithm optimization is described. In an example, a classification algorithm is optimized by calculating an evaluation sequence for a set of weighted feature functions that orders the feature functions in accordance with a measure of influence on the classification algorithm. Classification thresholds are determined for each step of the evaluation sequence, which indicate whether a classification decision can be made early and the classification algorithm terminated without evaluating further feature functions. In another example, a classifier applies the weighted feature functions to previously unseen data in the order of the evaluation sequence and determines a cumulative value at each step. The cumulative value is compared to the classification thresholds at each step to determine whether a classification decision can be made early without evaluating further feature functions.

20 Claims, 8 Drawing Sheets

CLASSIFICATION ALGORITHM OPTIMIZATION

BACKGROUND

Classification algorithms are used in a wide variety of applications for performing tasks that involve identifying a class to which a previously unseen item belongs. For example, classification algorithms can be used to process images, such that the pixels of the image are classified according to what they represent. An example of this is face detection, which can be used to control the focusing or operation of a digital camera. In this example, the pixels are classified as to whether or not they are part of a face in the image. Other examples include medical image analysis, email spam detection, document classification, and speech recognition.

Many classification algorithms are based on machine learning concepts, and are trained to perform a dedicated classification task. Linear classifiers are one of the most popular classification techniques. For binary classification tasks (i.e. those only having a positive or negative classification output, e.g. whether or not a face is present), the decision function $f: X \rightarrow \{-1,1\}$ takes the form:

$$F(x; w, f) = \text{sign}\left(\sum_{t=1}^{m} w_t f_t(x)\right) \quad (1)$$

Where $w_t \in R$ are learned weights, $f_t: X \rightarrow R$ are arbitrary feature functions evaluated on the instance x, and m is the number of features to evaluate. To use such a classifier, the feature functions $f_t$ and weights $w_t$ are learned using a set of training instances (i.e. examples for which the classification is pre-known). Once the feature functions $f_t$ and weights $w_t$ are learned, the algorithm can be used on previously unseen instances by calculating the cumulative sum of the weighted feature functions over all features. The sign (positive or negative) of the cumulative sum indicates whether the classification is positive or negative.

The above form of classifier in eqn. (1) includes many popular classifiers such as linear support vector machines and logistic regression classifiers, boosting, and kernelized support vector machines. Although the methods differ in what feature functions and weight vectors are used, for all methods the test-time evaluation consists of evaluating an equation of the above form.

In order to achieve high generalization performance, a large number m of features are often utilized. For example, in the case of Boosting thousands of weak learners, each defining a new feature, are selected, whereas for non-parametric methods such as Kernelized SVMs the number of features $f_t(\cdot)=k(\cdot,x_t)$ grows with the number of training instances. In general, evaluating the above form of classifier for a single instance has a complexity that is linear in m.

However, achieving low test-time (also called runtime or evaluation time) complexity is an key design goal for practical applications. This has led to a methods aimed at producing a classifier with having low evaluation complexity. An example of such a method is called "feature selection". Feature selection aims to choose a subset of the features that perform well, and use this reduced subset of features at test-time. However, whilst this improves the test-time complexity, it does this at the expense of accuracy of the classifier.

The embodiments described below are not limited to implementations which solve any or all of the disadvantages of known classification algorithms.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present a selection of concepts disclosed herein in a simplified form as a prelude to the more detailed description that is presented later.

Classification algorithm optimization is described. In an example, a classification algorithm is optimized by calculating an evaluation sequence for a set of weighted feature functions that orders the feature functions in accordance with a measure of influence on the classification algorithm. Classification thresholds are determined for each step of the evaluation sequence, which indicate whether a classification decision can be made early and the classification algorithm terminated without evaluating further feature functions. In another example, a classifier applies the weighted feature functions to previously unseen data in the order of the evaluation sequence and determines a cumulative value at each step. The cumulative value is compared to the classification thresholds at each step to determine whether a classification decision can be made early without evaluating further feature functions.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in the context of a face detection system, the system described is provided as an example and not a limitation. As those skilled in the art will appreciate, the present examples are suitable for application in a variety of different types of classification systems.

Figure 1:
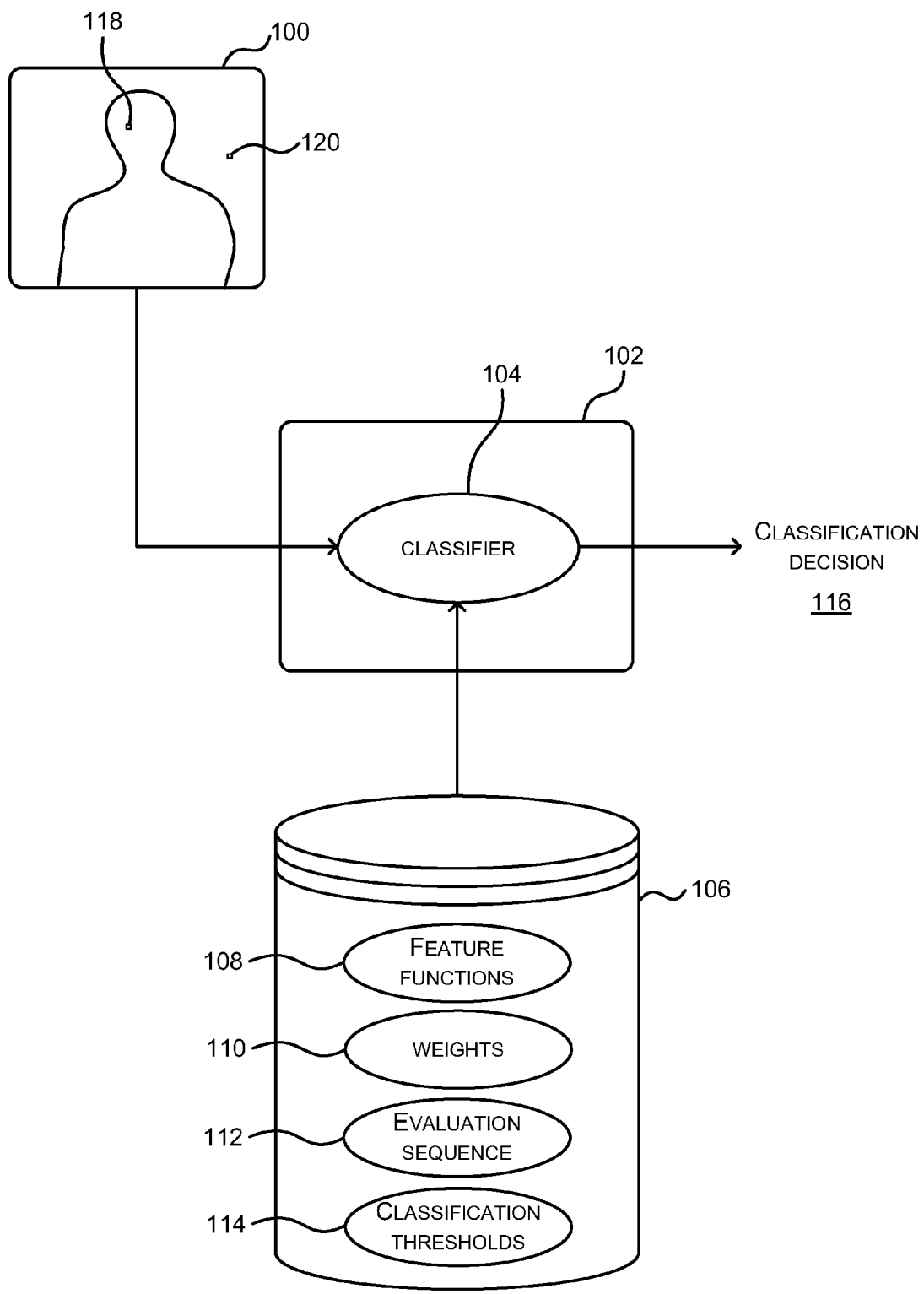
FIG. 1 illustrates an example classifier used for face detection.

Reference is first made to FIG. 1, which illustrates an example classifier used for face detection, in which the classifier optimization technique described below can be used. FIG. 1 shows an unseen image 100 (such as that captured by the sensor of a digital camera) of a person. The unseen image 100 is provided to a computing device 102, which is executing a classifier 104 (an example structure for the computing device is illustrated below with reference to FIG. 8). The classifier implements a classification algorithm of the form shown above in eqn. (1).

The classifier receives the unseen image 100 as an input. The classifier also receives as an input stored data from a storage device 106. The stored data comprises a set of trained feature functions 108 (denoted $f_t$ in eqn. (1) above) and weights 110 (denoted $w_t$ in eqn. (1) above). The feature functions 108 and weights 110 have been pre-trained using training data to detect faces in an image, using known classifier training techniques. The stored data also comprises an evaluation sequence 112 and a set of classification thresholds 114, which have been computed to optimize the classifier operation, and are described in more detail below.

The classifier 104 analyses the unseen image 100 pixel by pixel, using the classification algorithm and the stored data to produce a classification decision 116 indicating whether a given pixel represents part of a face in the image. For example, in the case of pixel 118, the classification decision 116 may be positive, indicating that pixel 118 does form part of a face. Conversely, in the case of pixel 120, the classification decision 116 may be negative, indicating that pixel 118 does not form part of a face.

Note that the example of FIG. 1 is merely illustrative, and a similar classifier can be used for many different tasks other than face detection.

Three observations can be made about the operation of classification algorithms of the form shown in eqn. (1): i) the order of the summation in (1) does not influence the ultimate classification result; ii) the classification decision is dependent only on the sign of the sum; and iii) a sample can be classified early by evaluating only part of the sum if the remaining part is known not to influence the classification decision.

Figure 2:
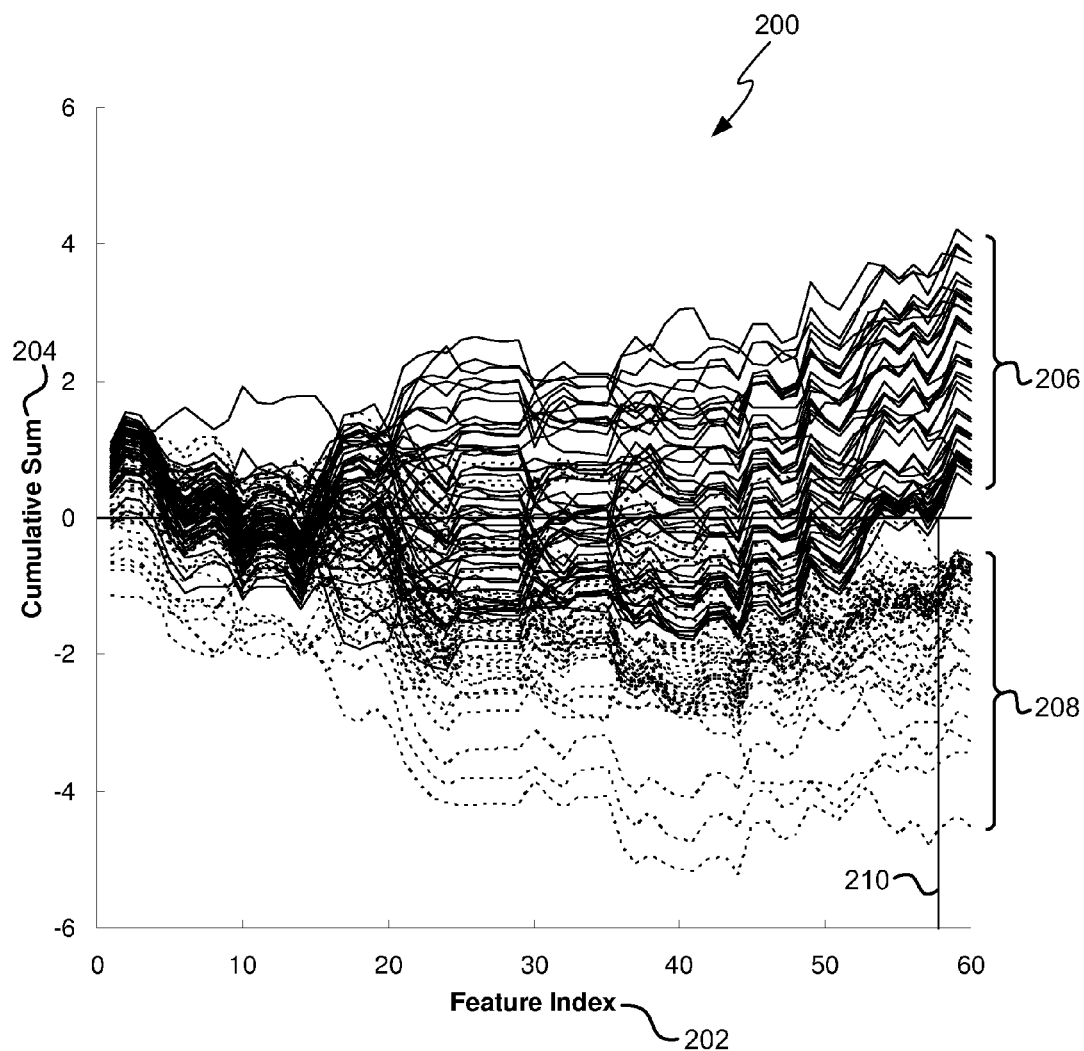
FIG. 2 illustrates an example trace of cumulative sum against unordered features for a set of illustrative instances.

These observations are illustrated with reference to FIGS. 2 and 3. Referring first to FIG. 2, a trace 200 is shown of the value of the cumulative sum for a set of example instances (in this illustrative example these are taken from the UCI Splice data set) when applied to a linear classifier using 60 features. The x-axis indexes the feature 202 being used at each step of the cumulative sum, and the y-axis shows the value of the cumulative sum 204. A first portion of the example instances are classified as positive 206 (these are shown with solid lines), and these instances end up with a cumulative sum above zero after the 60 features are evaluated. A second portion of the example instances are classified as negative 208 (these are shown with dashed lines), and these instances end up with a cumulative sum below zero after the 60 features are evaluated.

In the trace of FIG. 2, the features were evaluated in the order that resulted from the classifier training process. It can also be seen from the trace 200 that after 57 features have been evaluated (indicated by line 210), none of the instances cross the zero line. In other words, evaluation of the final three features does not change the classification results. These three final features could therefore be skipped when evaluating these example instances without affecting accuracy, although this would only provide a small improvement in test-time complexity.

However, it is noted in the observations above that the sequence in which the features are evaluated can be changed arbitrarily, without affecting the overall classification result. FIG. 3 illustrates how re-ordering the sequence in which the features are evaluated can be used to improve the test-time complexity without affecting classification accuracy.

Figure 3:
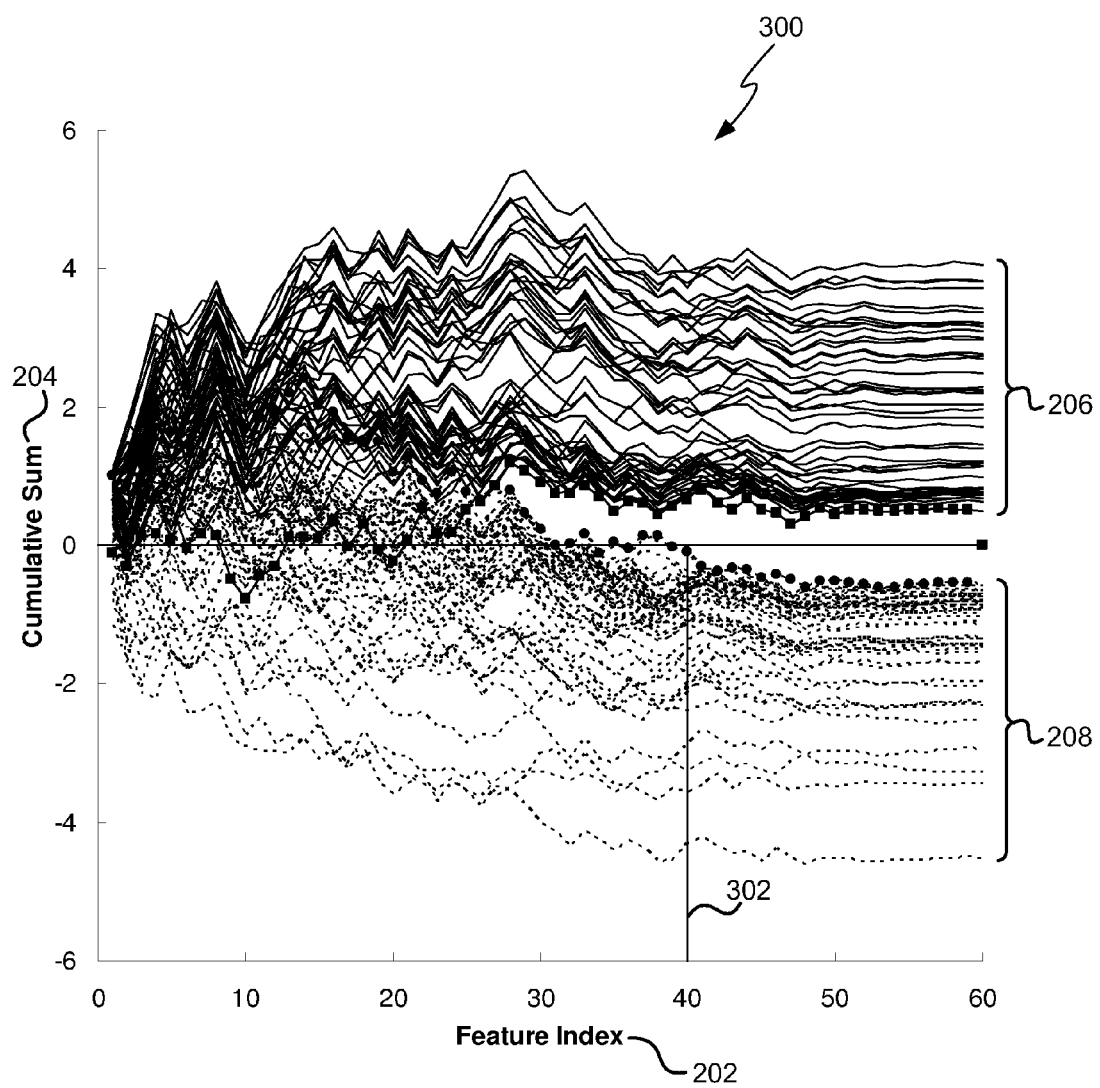
FIG. 3 illustrates an example trace of cumulative sum against optimized, ordered features for the set of illustrative instances.

FIG. 3 shows a trace 300 of the value of the cumulative sum for the same set of example instances as FIG. 2 when applied to the same linear classifier using the same 60 features. It can be seen that the final result of the trace 300 is the same as that in FIG. 2, with both positive 206 and negative 208 instances achieving the same cumulative sums after all 60 features are evaluated. However, in FIG. 3, the features are applied in a different, optimized sequence from that shown in FIG. 2. As a result of using the optimized evaluation sequence for the features, after 40 features have been evaluated (indicated by line 302), none of the instances cross the zero line. In other words, evaluation of the final 20 features does not change the classification results. These final 20 features could therefore be skipped when evaluating these example instances without affecting accuracy. This represents a significant improvement in test-time complexity.

Therefore, by optimizing the ordering of the evaluation sequence of features, for many instances only a small subset of features can to be evaluated in order to safely (i.e. accurately) classify them. Provided below are two general and parameter-free methods (FIGS. 5 and 6) for post-processing any linear classifier for test-time evaluation speed, by optimizing the feature evaluation sequence. The decision as to when an instance can be classified early is made based on selecting thresholds for each cumulative summation term. The thresholds are selected such that they are still guaranteed not to cause additional misclassifications on a given training set, as described in more detail below (FIG. 7). The result of the optimization is therefore the evaluation sequence 112 and classification thresholds 114 as shown in FIG. 1.

Figure 4:
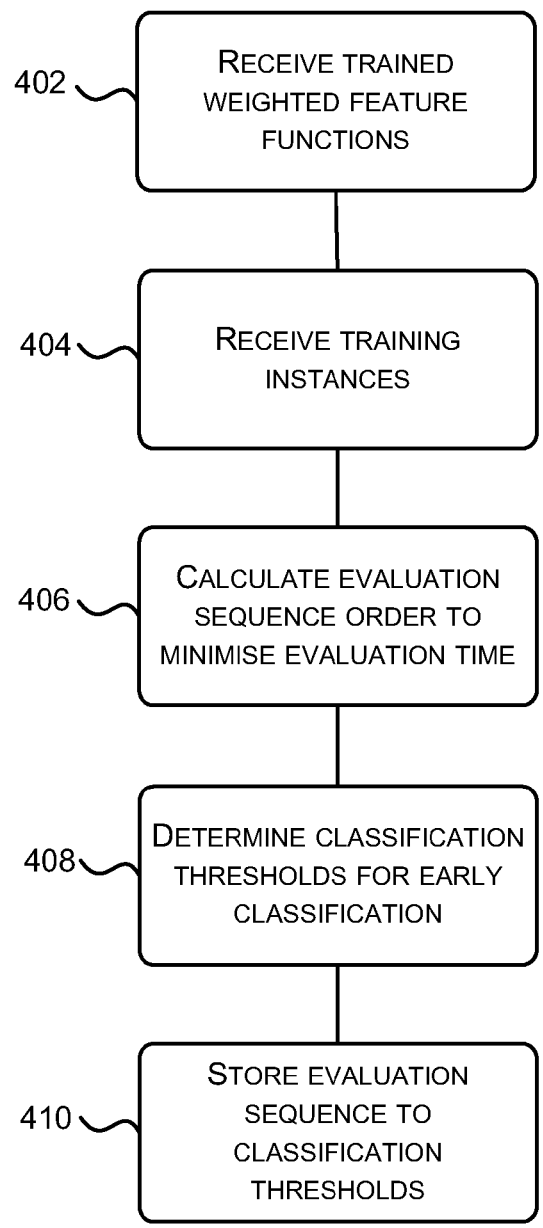
FIG. 4 illustrates a flowchart of a process for determining an evaluation sequence for features and classification thresholds.

Reference is now made to FIG. 4, which illustrates a flowchart of an overall optimization process for determining the evaluation sequence 112 and classification thresholds 114 for a classifier. The optimization process of FIG. 4 can be executed on a processor, such as in computing device 102. In the process of FIG. 4, the classifier has already been trained in a preceding step.

The optimization process receives 402 the trained weighted feature functions, i.e. $f_t$ and $w_t$, and also receives 404 the training instances used to train the weighted feature functions (i.e. the pre-classified training data set). An evaluation sequence defining an order in which to apply the weighted feature functions is then calculated 406. The calculation of the evaluation sequence is based upon a measure of the influence that a weighted feature function has on the classification algorithm. In other words, the evaluation sequence is selected such that those feature functions having a substantial effect on the classification decisions are placed earlier in the evaluation sequence, thereby increasing the likelihood that a classification decision can be made earlier, and minimizing the evaluation time. Two techniques for selecting the evaluation sequence are described below with reference to FIGS. 5 and 6.

In order to determine whether an unseen instance can be classified early when applying the evaluation sequence, classification thresholds are used. These classification thresholds are determined 408 using the optimized evaluation sequence. In one example, the classification thresholds are determined using an algorithm called direct backward pruning, described below with reference to FIG. 7. Note that the determination of the classification thresholds does not have to be performed after the calculation of the evaluation sequence, but can in some examples be performed during or in parallel with the calculation of the evaluation sequence.

Once the evaluation sequence and classification thresholds have been determined, they are stored 410 at a storage device, such as storage device 106 of FIG. 1 for use at test-time.

Before the techniques for determining the evaluation sequence and classification thresholds are described, an explanation of how these are used by the classification algorithm at test-time is made. Because the ordering of the features impacts the operation of the classification algorithm, this is defined formally as follows: given a linear classification function $f(x)=\sum_{t=1}^{m} w_t f_t(x)$, and an ordering Q of the feature indices $\{1, \ldots, m\}$, the ordered cumulative sum $g(x; Q, f, w, t)$ is defined as:

$$g(x; Q, f, w, t) = \begin{cases} 0 & \text{if } t = 0, \\ g(x; Q, f, w, t-1) + w_{Q(t)} f_{Q(t)}(x) & \text{otherwise.} \end{cases}$$

Therefore, $g(x; Q, f, w, t)$ gives the ordered cumulative sum at a given feature index t, for a certain evaluation sequence Q. This ordered cumulative sum is used when operating the classifier to determine whether early classification decisions can be made, as described below.

If the classifier is a binary classifier that produces either positive or negative classification decisions, then the result of the optimization process is the evaluation sequence Q and two vectors of early classification thresholds denoted $R^+$ and $R^-$. The classification threshold vectors comprise values for each feature index t, i.e. $R^+, R^- \in R^m$. Then, when evaluating the classification algorithm on unseen data, at each step of the evaluation sequence the ordered cumulative sum is found and used to make early classification decisions as follows:

for t=1, . . . , m
if $g(x; Q, f, w, t) > R_t^+$ then classify as positive
if $g(x; Q, f, w, t) \leq R_t^-$ then classify as negative This is denoted the early binary classifier chain $d(\bullet; Q, R, f, w)$. In other words, the ordered cumulative sum for some unseen data is found at each feature index t, and compared to the two classification thresholds. If the ordered cumulative sum for the unseen data at feature index t is greater than the positive classification threshold for t, then an early classification decision can be made, and the unseen data is classified as positive. If the ordered cumulative sum for some unseen data at a given feature index t is less than or equal to the positive classification threshold for t, then an early classification decision can be made, and the unseen data is classified as positive. If neither of these conditions is met, then an early classification decision cannot be made at this t, and the algorithm moves onto the next feature index t in the evaluation sequence. Therefore, this enables the classification decision to be output early under certain conditions, and the classification algorithm terminated without considering further features, thereby reducing evaluation time.

In addition, if $R^+(m)$ and $R^-(m)=0$, then after evaluating all features the result is the same as if the sign($\bullet$) function is used. This means that the classification decision is the same as that obtained without ordering the features.

In addition to binary classifiers, multi-class classifiers can also be used. Multi-class classifiers can generate a classification decision having more than two possible values. Multi-class classifiers operate in a similar manner to the binary classifier described above, except that the classification algorithm is of the form:

$$\text{argmax}_{y \in Y} \sum_{t=1}^{m} w_t^y f_t(x)$$

Where y is a classification belonging to a set of possible classifications y. This algorithm means that the classification y is selected that gives the largest cumulative sum. In the case of a multi-class classifier with n output classes, then the result of the optimization process is the evaluation sequence Q and n vectors of early classification thresholds denoted $R^{y_1}$, $R^{y_2}, \ldots, R^{y_n} \in R^m$ each comprising values for each feature index t. Then, when evaluating the multi-class classification algorithm on unseen data, at each step of the evaluation sequence the ordered cumulative sum is found and used to make early classification decisions as follows:

for t=1, . . . , m
for y∈Y: if $g(x; Q, f, w^y, t) > R_t^y$ then classify x as class y and if this is true for multiple classes, decide among them randomly Classify by $\text{argmax}_{y \in Y} g(x; Q, f, w^y, m)$ This is denoted the early multi-class classifier chain $d(\bullet; Q, R, f, w)$. In other words, the classifier determines the ordered cumulative sum at each step t of the evaluation sequence Q, and if this is larger than one of the classification thresholds then an early classification decision for the class associated with this threshold is made. If the ordered cumulative sum is larger than more than one of the classification thresholds then a class is randomly selected from those thresholds, and an early classification decision is made. The last line of the above early multi-class classifier chain ensures that at the last step in of the evaluation sequence, the result is the same as that obtained without ordering the features.

Therefore, the above two examples enable both binary and multi-class classifiers to be created that utilize the evaluation sequence 112 and classification thresholds 114 to make early classification decisions without evaluating all the features of the classifier. These classifiers can be used in systems such as that shown in FIG. 1 to reduce the test-time complexity to generate classification decisions in a faster time.

Figure 5:
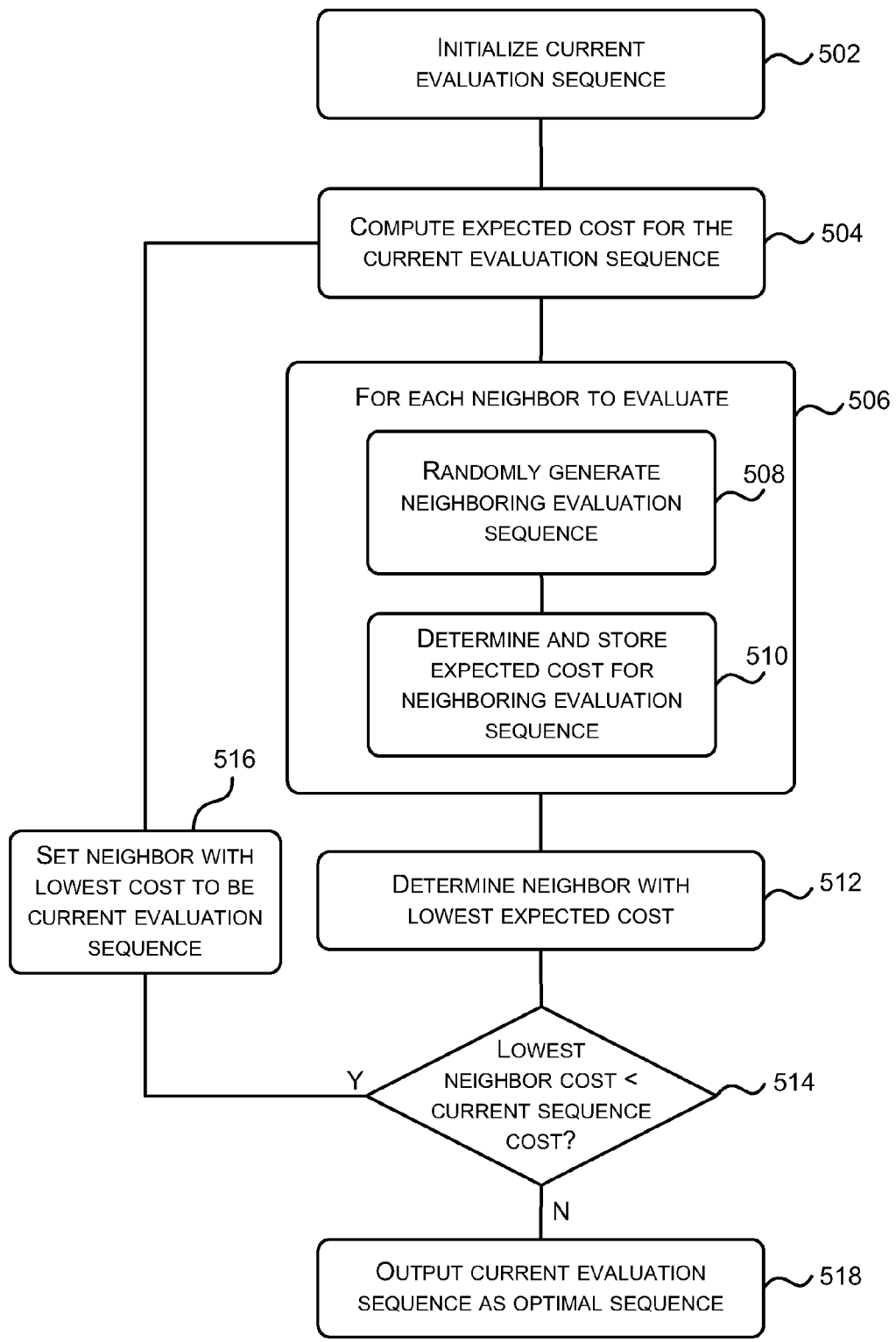
FIG. 5 illustrates a local search algorithm for determining the evaluation sequence.

Reference is now made to FIG. 5, which illustrates a flow-chart of a first technique for calculating the optimized evaluation sequence. The technique shown in FIG. 5 is known as a local search algorithm.

Firstly, the current evaluation sequence is set 502 to an initial value. In examples, this can be initialized to the original ordering from the training, or set to a random ordering. A measure called the expected evaluation cost for the current evaluation sequence is then computed 504. The expected evaluation cost relates to the expected number of features that have to be evaluated to reach a classification decision. Formally, the expected evaluation cost is defined as follows: given a set of independent and identically distributed training instances $\{(x_i, y_i)\}_{i=1, \ldots, N}$, the expected evaluation cost is found as:

$$C(\{(x_i, y_i)\}_{i=1,\ldots,N}; Q, R, f, w) = \frac{1}{N}\sum_{i=1}^{N} C(x_i; Q, R, f, w)$$

Where:

$$C(x_i; Q, R, f, w) = \max_{1 \le t \le m}\left[t\prod_{s=1}^{t}\prod_{y \in Y} I(g(x_i; Q, R, f, w^y, s) \le R_s^y)\right] + 1$$

Where the function I(pred) evaluates to one if the given predicate is true, and zero otherwise. Once the expected evaluation cost has been evaluated for the current evaluation sequence, a predetermined number D of neighboring evaluation sequences are assessed 506. A neighboring evaluation sequence is randomly generated 508. This can be performed using any suitable technique including (but not limited to):

An adjacent pairwise swap, in which two adjacent indices are selected and swapped, e.g. to produce from {5; 2; 4; 3; 1} the permutation {5; 4; 2; 3; 1};

A random pairwise swap, in which two indices are selected randomly and swapped, e.g. to produce from {5; 2; 4; 3; 1} the permutation {3; 2; 4; 5; 1}; and A multiple swap, which randomly selects k indices and swaps them at random, e.g. for k=3 to produce from {5; 2; 4; 3; 1} the permutation {1; 2; 5; 3; 4} by swapping {5; 4; 1}.

Once the neighboring evaluation sequence has been generated, the expected evaluation cost is determined 510 (as above) for this neighboring evaluation sequence and stored. This is repeated for each of the D of neighboring evaluation sequences until all D have been assessed 506. The neighboring evaluation sequence having the lowest expected evaluation cost is then determined 512, and compared 514 to the expected evaluation cost of the current evaluation sequence. If the lowest neighboring expected evaluation cost is less than the current expected evaluation cost, then the neighboring evaluation sequence having the lowest expected evaluation cost is set 516 to be the new value for current evaluation sequence and the process repeats. If, however, the lowest neighboring expected evaluation cost is not less than the current expected evaluation cost, then the current evaluation cost is output 518 as the optimized evaluation sequence.

Therefore, the process of FIG. 5 repeatedly searches neighboring alternatives to the current evaluation sequence, iteratively improving it until no improved evaluation sequences are found. The algorithm monotonically decreases the expected evaluation cost thus producing a faster classifier. Because the set of permutations is finite it additionally is guaranteed to converge in a finite number of steps.

Figure 6:
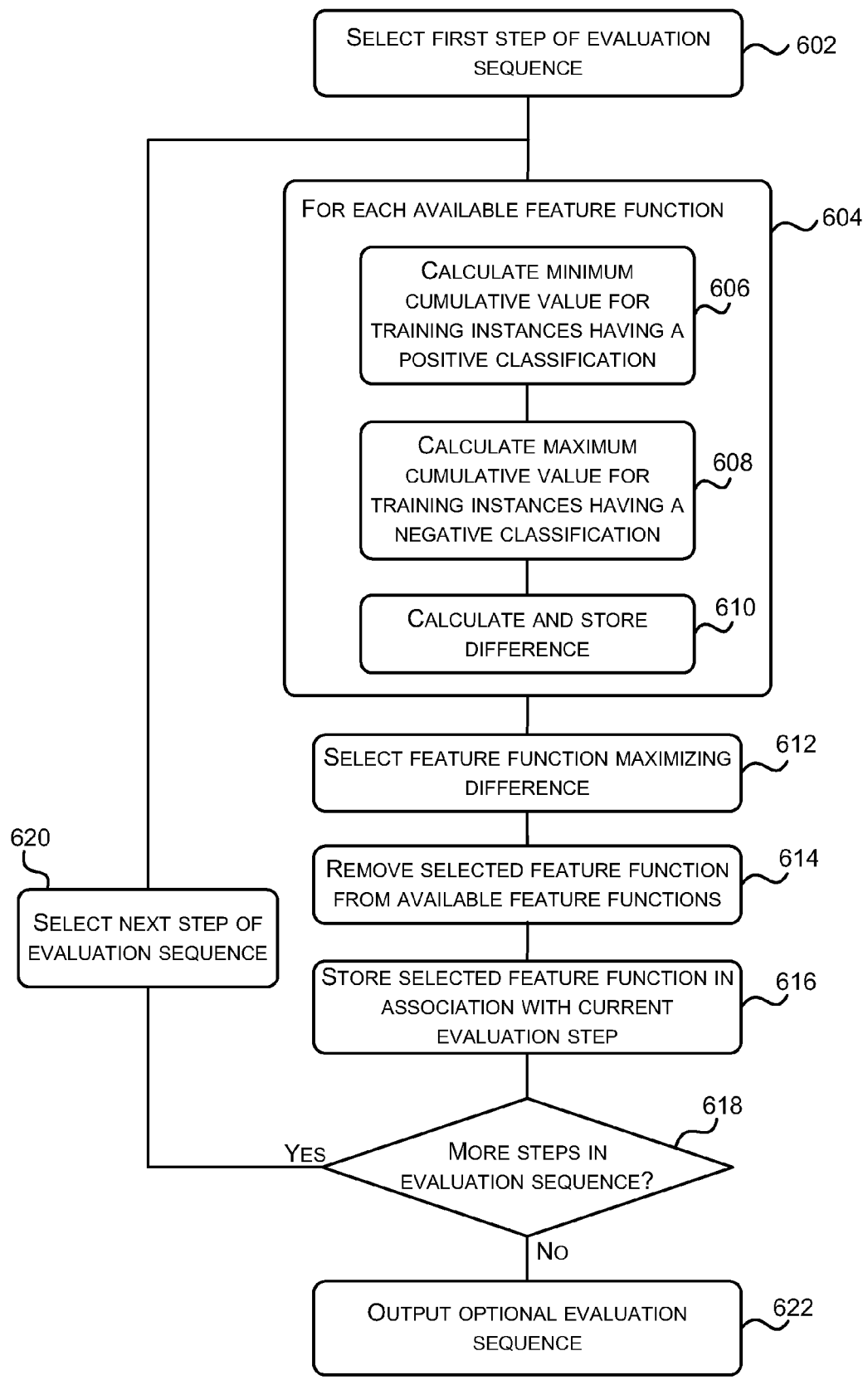
FIG. 6 illustrates a maximum separation bound greedy algorithm for determining the evaluation sequence.
Figure 7:
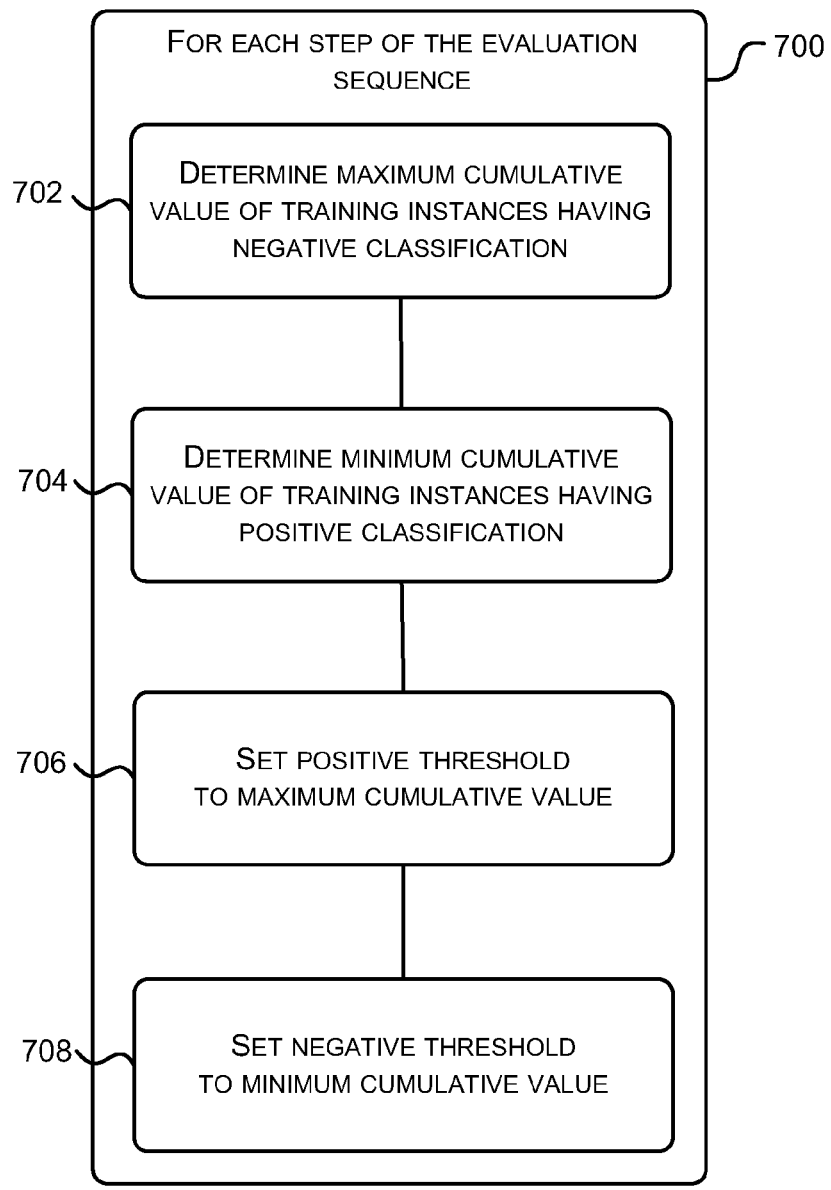
FIG. 7 illustrates a direct backward pruning algorithm for determining the classification thresholds.

Reference is now made to FIG. 6, which illustrates an alternative technique for calculating the optimized evaluation sequence. This technique is known as a maximum separation bound greedy algorithm. The previous technique in FIG. 5 attempts to find the optimized evaluation sequence by trying several different overall sequences. The technique in FIG. 6 differs from this as it aims to select the optimal feature for each step of the sequence in turn, such that the algorithm finds the optimized evaluation sequence in one pass without evaluating several different overall sequences. The example of FIG. 6 is for the binary classification case.

The first step (t=1) of the evaluation sequence is selected 602, and then an analysis 604 is performed for each available feature that can be allocated to this step of the evaluation sequence. A feature is "available" if it has not previously been allocated to a step of the evaluation sequence (which clearly does not exclude any features for the first step).

The analysis 604 determines what is known as the maximum separation between the positive and negative classifications. This can be visualized with reference to FIG. 3. Consider, for example, the values for the cumulative sum for each of the training instances at line 302. The training instances are all known in advance to have either a positive or negative classification (indicated by the solid and dashed lines). Therefore, a set of cumulative sum values can be found for those training instances having a positive classification, and a set of cumulative sum values can be found for those training instances having a negative classification.

If the minimum value is taken from the set of cumulative sum values for those training instances having a positive classification, then this represents the lower extreme of the envelope formed by all the training instances having a positive classification (indicated by squares in FIG. 3). Similarly, if the maximum value is taken from the set of cumulative sum values for those training instances having a negative classification, then this represents the upper extreme of the envelope formed by all the training instances having a negative classification (indicated by circles in FIG. 3). In the illustrative example of FIG. 3, at line 302, the minimum value of the cumulative sum values for the training instances with a positive classification is approximately +0.6, and the maximum value of the cumulative sum values for the training instances with a negative classification is approximately −0.1.

The separation (i.e. difference) between the minimum value of the cumulative sum values for the training instances with a positive classification and the maximum value of the cumulative sum values for the training instances with a negative classification can be calculated as the measure of influence that a given feature has on the classification at this point of the ordered evaluation sequence. This can be seen visually as the gap between the instances with a positive classification and a negative classification in FIG. 3.

Returning to FIG. 6, the analysis 604 finds this separation for each available feature function by calculating 606 the minimum cumulative sum value for the training instances having a positive classification, and calculating 608 the maximum value for the training instances having a negative classification (given the evaluation sequence determined so far). Difference between these (the separation) is calculated and stored 610.

Once all the available features have been analyzed, the stored separations are used to select 612 the available feature that maximizes the separation. In other words, the available feature that provides the maximum discrimination between the positive and negative training instances (i.e. has the most influence on the classification decision) is selected.

The selected feature function is then removed 614 from the available feature functions, so that it cannot be considered again in the future. The selected feature function is then stored 616 in association with the current evaluation sequence step. In other words, the selected feature function is allocated to current step of the evaluation sequence.

It is then determined 618 wither more steps remain for consideration in the evaluation sequence. If so, then the next step of the evaluation sequence is selected 620, and the process repeats. If not, then this means that the evaluation sequence is complete, and the optimized evaluation sequence is output 622.

The process described above with reference to FIG. 6 can be generally seen to greedily construct a good permutation for the evaluation sequence, and can achieve this with low runtime complexity.

The result of both the techniques described with respect to FIGS. 5 and 6 is an optimized evaluation sequence. As described above, in order for the classifier to be able to make early classification decisions, then a set of classification thresholds are also generated for this optimized sequence. A process for generating these classification thresholds is described with reference to FIG. 7.

The process of FIG. 7 implements an algorithm called "direct backward pruning". This is illustrated in FIG. 7 for a binary classifier. A multi-class classifier implementation is described afterwards. Generally speaking, like the separation calculation described above with reference to FIG. 6, this technique is based upon determination of the lower extreme of the positive classification instance envelope and the upper extreme of the negative classification envelope.

The algorithm of FIG. 7 performs a classification threshold determination 700 for each step of the optimized evaluation sequence. Therefore, the result of the algorithm is a vector of classification thresholds having the same number of values as there are steps in the evaluation sequence. For the case of a binary classifier, two such vectors are generated, denoted $R^+$ and $R^-$ as mentioned above. The determination 700 comprises a determination 702 of the maximum cumulative value of the training instances having a negative classification for the step of the evaluation sequence in question. In other words, the upper extreme of the negatively classified instances is found. Similarly, a determination 704 is made of the minimum cumulative value of the training instances having a positive classification for the step of the evaluation sequence in question. In other words, the lower extreme of the positively classified instances is found.

The positive threshold, $R^+$, is then set 706 to the maximum cumulative value of the training instances having a negative classification found in determination 702, and the negative, K, is then set 708 to the minimum cumulative value of the training instances having a positive classification found in determination 704. This is repeated for each step of the optimized evaluation sequence, until the classification thresholds are completed.

The operation of the classification thresholds can be visualized with reference to FIG. 3. As a classification algorithm moves through the features in the evaluation sequence it iterates along feature index axis. The classification thresholds $R^+$ and $R^-$ at each feature index are the upper bound of the negatively classified training instances and the lower bound of the positively classified training instances, respectively. Therefore, an early positive classification decisions can be made at any point along the feature index axis if the cumulative value is above the highest negatively classified training instance at that index. Similarly, an early negative classification decisions can be made at any point along the feature index axis if the cumulative value is below the lowest positively classified training instance at that index.

Similar classification thresholds can be determined for multi-class classifiers. For example, given a multi-class classifier of the form $\text{argmax}_{y \in Y} \Sigma_{t=1}^{m} w_t^y f_t(x)$, an evaluation sequence Q of $\{1, \ldots, m\}$, and a training set $\{(x_i, y_i)\}_{i=1, \ldots, N}$, the classification threshold $R_s^y$ for class y at step s is given by:

$$R_s^y := \max_{\substack{1 \leq i \leq N: \\ f(x_i) = y_i \neq y}} g(x_i, Q, f, w^y, s) = \max_{\substack{1 \leq i \leq N: \\ f(x_i) = y_i \neq y}} \sum_{t=1}^{s} w_{Q(t)}^y f_{Q(t)}(x_i)$$

In other words, the threshold $R_s^y$ is selected at step s that is the highest cumulative sum among all the training instances that are correctly classified with a class $y_i$ different from y.

Therefore, this corresponds to the upper extreme of the envelope formed from all the other classes different from y. This technique to set $R_s^y$ generalizes the binary case above by using the maximum response of all other classes to determine the threshold for the class under consideration. Moreover, that this technique does not introduce additional errors on the training set.

The explanations of the algorithms in FIGS. 5, 6 and 7 have considered the determination of the evaluation sequence and the classification thresholds separately. However, these can be combined into single, overall algorithms, which saves some computation relative to evaluating them separately. For example, the pseudocode below shows a combined algorithm for implementing the local search technique of FIG. 5, which outputs both the optimized evaluation sequence Q and the classifications thresholds R. The algorithm takes as input an initial evaluation sequence ordering $Q_{init}$, the training instances, and a number of neighbors to consider D.

```
1:   Q_current ← Q_init
2:   loop
3:     For Q_current set R
4:     Compute expected cost C(Q_current)
5:     for j = 1,...,D do
6:       Sample at random a neighbor Q_j of Q_current
7:       For Q_j set R
8:       Compute expected cost C(Q_j)
9:     end for
10:    Q_b ← argmin_j C(Q_j)
11:    if C(Q_current) > C(Q_j) then
12:      Q_current ← Q_b
13:    else
14:      Q ← Q_current
15:      break
16:    end if
17:  end loop
```

The above algorithm loops, searching different permutations of the evaluation sequence for the one having the lowest expected evaluation cost and calculating the classification thresholds for each permutation, until the test at line 11 fails (i.e. no improvement is seen), and the optimized evaluation sequence is set and the loop exited at line 15.

In another example, the pseudocode below shows a combined algorithm for implementing the maximum separation greedy technique of FIG. 6, which outputs both the optimized evaluation sequence Q and the classifications thresholds R.

```
1:   I ← {1,...,m}
2:   S ← {i|1 ≤ i ≤ N, y_i = sign(Σ_{t=1}^m w_t f_t(x_i))}
3:   Q ← ( )
4:   for t = 1,...,m do
5:     if {i ∈ S|y_i = 1} = ∅ or {i ∈ S|y_i = -1} = ∅ then
6:       For t ≤ s ≤ m, set R^+(s) = ∞, R^-(s) = -∞, and Q(s) ←
              I(s) in an arbitrary order
7:       return (Q,R^+,R^-)
8:     else
9:       Q(t) ← argmax_{j∈I}(min_{i∈S,y_i=1}[g(x_i,Q,f,w,t - 1) + w_j f_j(x_i)]) -
                max_{i∈S,y_i=-1}[g(x_i,Q,f,w,t - 1) + w_j f_j(x_i)])
10:      I ← I \ {Q(t)}
11:      R^+(t) ← max_{i∈S,y_i=-1} g(x_i,Q,f,w,t)
12:      R^-(t) ← min_{i∈S,y_i=1} g(x_i,Q,f,w,t)
13:      S ← S \ ({i ∈ S|g(x_i,Q,f,w,t) > R^+(t)} ∪
              {i ∈ S|g(x_i,Q,f,w,t) < R^-(t)})
14:    end if
15:  end for
```

This algorithm operates in a similar manner to that shown in FIG. 6, calculating the separations and selecting the feature that maximizes the separation at line 9. I identifies the available features, which are initialized to all features in line 1, and a feature removed from I in line 10 when selected. Set S maintains a list of all training instances still relevant. A training instance is still relevant if it has not yet been classified, but is correctly classified by the full classification algorithm (i.e. not using early classification). S is initialized to all correctly classified instances in line 2, and updated to remove those correctly classified following selection of a feature in line 13. Lines 6 and 7 are executed in the case that there are no training instances left in S with either a positive or negative classification, and allocates the remaining features to the sequence in an arbitrary order, and sets the positive and negative classification thresholds to very high and very low values, respectively, before exiting the algorithm. Lines 11 and 12 calculate the classification thresholds using direct backward pruning.

Figure 8:
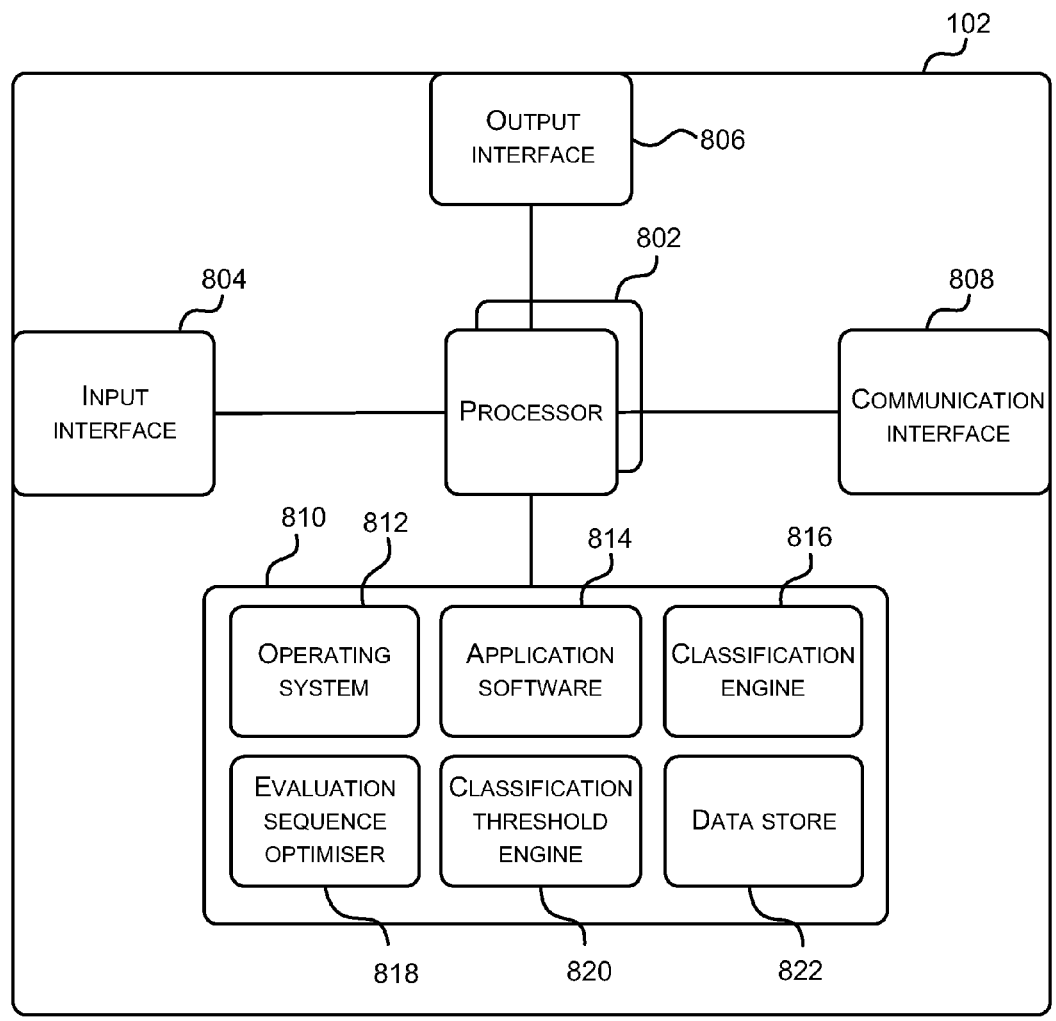
FIG. 8 illustrates an exemplary computing-based device in which embodiments of the classification algorithm optimizer may be implemented.

Reference is now made to FIG. 8, which illustrates various components of an exemplary computing device 102 which may be implemented as any form of a computing and/or electronic device, and in which embodiments of the classification optimization techniques may be implemented.

Computing device 102 comprises one or more processors 802 which may be microprocessors, controllers or any other suitable type of processors for processing computing executable instructions to control the operation of the device in order to perform gesture recognition. In some examples, for example where a system on a chip architecture is used, the processors 802 may include one or more fixed function blocks (also referred to as accelerators) which implement a part of the gesture recognition methods in hardware (rather than software or firmware).

The computing-based device 102 also comprises an input interface 804 arranged to receive input from one or more devices or data sources, such as the image 100 of FIG. 1. An output interface 806 is also provided and arranged to provide output to, for example, a storage device or display system integral with or in communication with the computing device. The display system may provide a graphical user interface, or other user interface of any suitable type although this is not essential. A communication interface 808 may optionally be provided, which can be arranged to communicate with one or more communication networks (e.g. the internet).

The computer executable instructions may be provided using any computer-readable media that is accessible by computing device 102. Computer-readable media may include, for example, computer storage media such as memory 810 and communications media. Computer storage media, such as memory 810, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (memory 810) is shown within the computing device 102 it will be appreciated that the storage may be distributed or located remotely and accessed via a network or other communication link (e.g. using communication interface 808).

Platform software comprising an operating system 812 or any other suitable platform software may be provided at the computing device to enable application software 814 to be executed on the device. The memory 810 can store executable instructions to implement the functionality of the classification engine 816 implementing the classifier for use on unseen data, an evaluation sequence optimizer 818 (e.g. arranged to determine the evaluation sequence using the algorithms of FIG. 5 or 6), and a classification threshold engine 820 (e.g. arranged to determine the classification thresholds using the algorithm of FIG. 7). The memory 810 can also provide a data store 822, which can be used to provide storage for data used by the processors 802 when performing the classification optimization techniques, such as that stored by the storage device 106 in FIG. 1.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A computer-implemented method of optimizing a classification algorithm, comprising:
    receiving, at a processor, a set of trained weighted feature functions for the classification algorithm, and a plurality of training instances;
    calculating an evaluation sequence for applying the trained weighted feature functions to the plurality of training instances that orders the feature functions in accordance with a measure of influence on the classification algorithm;
    determining at least one classification threshold for each step of the evaluation sequence, wherein each classification threshold indicates whether a classification decision can be made at an associated step of the evaluation sequence and the classification algorithm terminated without evaluating further feature functions;
    storing the evaluation sequence and classification thresholds at a storage device; and
    at least one of:
        A) the classification algorithm being a binary classifier in which the classification decision is one of: positive or negative, and the step of determining comprising:
            determining a first and second threshold for each step of the evaluation sequence;
            computing the first threshold using a maximum cumulative value at that step of the evaluation sequence from those training instances having a negative classification; and
            computing the second threshold using a minimum cumulative value at that step of the evaluation sequence from those training instances having a positive classification; or
        B) the step of calculating the evaluation sequence comprising:
            i) selecting a current evaluation sequence order;
            ii) determining an expected evaluation cost for the current evaluation sequence;
            iii) randomly selecting at least one neighboring evaluation sequence order;
            iv) determining an expected evaluation cost for the or each neighboring evaluation sequence order;
            v) determining whether the minimum expected evaluation cost for the or each neighboring evaluation sequence order is less than the expected evaluation cost for the current evaluation sequence, and, if so, updating the current evaluation sequence order to the order having the minimum expected evaluation cost.

2. A method according to claim 1, wherein the at least one classification threshold is determined using direct backward pruning.

3. A method according to claim 1, wherein the classification algorithm is a binary classifier in which the classification decision is one of: positive or negative.

4. A method according to claim 3, wherein the step of determining comprises:
    determining a first and second threshold for each step of the evaluation sequence;
    computing the first threshold using a maximum cumulative value at that step of the evaluation sequence from those training instances having a negative classification; and
    computing the second threshold using a minimum cumulative value at that step of the evaluation sequence from those training instances having a positive classification.

5. A method according to claim 1, wherein the step of calculating the evaluation sequence comprises determining an evaluation sequence order that minimizes an expected evaluation cost for the classification algorithm.

6. A method according to claim 1, wherein the step of calculating the evaluation sequence comprises:
    i) selecting a current evaluation sequence order;
    ii) determining an expected evaluation cost for the current evaluation sequence;
    iii) randomly selecting at least one neighboring evaluation sequence order;
    iv) determining an expected evaluation cost for the or each neighboring evaluation sequence order;
    v) determining whether the minimum expected evaluation cost for the or each neighboring evaluation sequence order is less than the expected evaluation cost for the current evaluation sequence, and, if so, updating the current evaluation sequence order to the order having the minimum expected evaluation cost.

7. A method according to claim 6, wherein the step of calculating the evaluation sequence further comprises repeating steps ii) to v) until the minimum expected evaluation cost for the or each neighboring evaluation sequence order is not less than the expected evaluation cost for the current evaluation sequence.

8. A method according to claim 6, wherein the step of randomly selecting at least one neighboring evaluation sequence order comprises at least one of:
    randomly selecting two adjacent steps in the current evaluation sequence and swapping them;
    randomly selecting two steps in the current evaluation sequence and swapping them; and
    randomly selecting a predetermined number of steps in the current evaluation sequence and swapping them at random.

9. A method according to claim 3, wherein the measure of influence on the classification algorithm for a given step of the evaluation sequence is determined from the difference between:
- a minimum cumulative value at the given step of the evaluation sequence from those training instances having a positive classification; and
- a maximum cumulative value at the given step of the evaluation sequence from those training instances having a negative classification.

10. A method according to claim 9, wherein the step of calculating the evaluation sequence comprises sequentially selecting one of the trained weighted feature functions such that the measure of influence is maximized at each step of the evaluation sequence.

11. A method according to claim 1, wherein the classification algorithm is a multi-class classifier in which the classification decision is one of a predefined number of classifications.

12. A method according to claim 11, wherein the step of determining comprises:
- determining a threshold for each of the predefined number of classifications at each step of the evaluation sequence; and
- computing the threshold for one of the classifications using a maximum cumulative value at that step of the evaluation sequence from each of those training instances having the remaining classifications.

13. A method according to claim 1, wherein the classification algorithm is a linear classification algorithm.

14. A method according to claim 13, wherein the classification algorithm determines the classification decision from a cumulative sum of the weighted feature functions.

15. A method according to claim 1, wherein the classification algorithm is at least one of: a linear support vector machine; a logistic regression classifier; a boosting classifier; and a kernelized support vector machine.

16. A classifier, comprising:
- an input interface arranged to receive data to be classified;
- a storage device arranged to store a set of trained weighted feature functions, an evaluation sequence defining an order for applying the feature functions, and at least one classification threshold for each step of the evaluation sequence;
- a processor arranged to: apply the weighted feature functions to the data in the order of the evaluation sequence and determine a cumulative value at each step; compare the cumulative value to the or each classification threshold at each step; and determine from the comparison at each step whether a classification decision can be made without evaluating further feature functions;
- an output output interface arranged to output the classification decision; and
- at least one of
  - the classifier being a binary classifier in which the classification decision is one of positive or negative, the storage device being arranged to store a first and second threshold for each step of the evaluation sequence, and the processor being arranged to determine that the classification decision is positive if the cumulative value is greater than the first threshold for a given step, and determine that the classification decision is negative if the cumulative value is less than or equal to the second threshold for the given step; or
  - the classifier being a multi-class classifier in which the classification decision is one of a predefined number of classifications, the storage device being arranged to store a threshold for each of the classifications at each step of the evaluation sequence, and the processor being arranged to determine whether the cumulative value is greater than only one threshold, and if so set the classification decision to the classification associated with that threshold, and determine whether the cumulative value is greater than more than one of the thresholds, and if so set the classification decision to a randomly selected one of the classifications associated with those thresholds.

17. A classifier according to claim 16, wherein the classifier is a binary classifier in which the classification decision is one of positive or negative, the storage device is arranged to store a first and second threshold for each step of the evaluation sequence, and the processor is arranged to determine that the classification decision is positive if the cumulative value is greater than the first threshold for a given step, and determine that the classification decision is negative if the cumulative value is less than or equal to the second threshold for the given step.

18. A classifier according to claim 16, wherein the classifier is a multi-class classifier in which the classification decision is one of a predefined number of classifications, the storage device is arranged to store a threshold for each of the classifications at each step of the evaluation sequence, and the processor is arranged to determine whether the cumulative value is greater than only one threshold, and if so set the classification decision to the classification associated with that threshold, and determine whether the cumulative value is greater than more than one of the thresholds, and if so set the classification decision to a randomly selected one of the classifications associated with those thresholds.

19. A classifier according to claim 16, wherein:
- the classifier is a face detector and the data comprises an image;
- the classifier is a text analyzer and the data comprises a text document;
- the classifier is a spam detector and the data comprises an email; or
- the classifier is an organ classifier and the data comprises a medical image.

20. One or more computer storage media with device-executable instructions that, when executed by a computing system, direct the computing system to perform steps comprising:
- receiving an image comprising a plurality of pixels;
- selecting one of the pixels of the image;
- retrieving a set of weighted feature functions trained to detect a face in an image, an optimized evaluation sequence defining an order for applying the feature functions, and a first and second classification threshold for each step of the evaluation sequence;
- at each step of the evaluation sequence:
  - applying the feature function for this step of the evaluation sequence to the pixel and determining a cumulative value;
  - comparing the cumulative value to the first and second classification threshold;
  - in the case that the cumulative value is greater than the first threshold, outputting a classification indicating that a face is present at the pixel without evaluating further steps of the evaluation sequence; and in the case that the cumulative value is less than or equal to the second threshold, outputting a classification indicating that a face is absent at the pixel without evaluating further steps of the evaluation sequence.

* * * * *